Oct. 28, 1941.    B. BURNS    2,260,797
MOTOR VEHICLE WITH STARTING CLUTCH
Original Filed Jan. 30, 1939    6 Sheets-Sheet 1
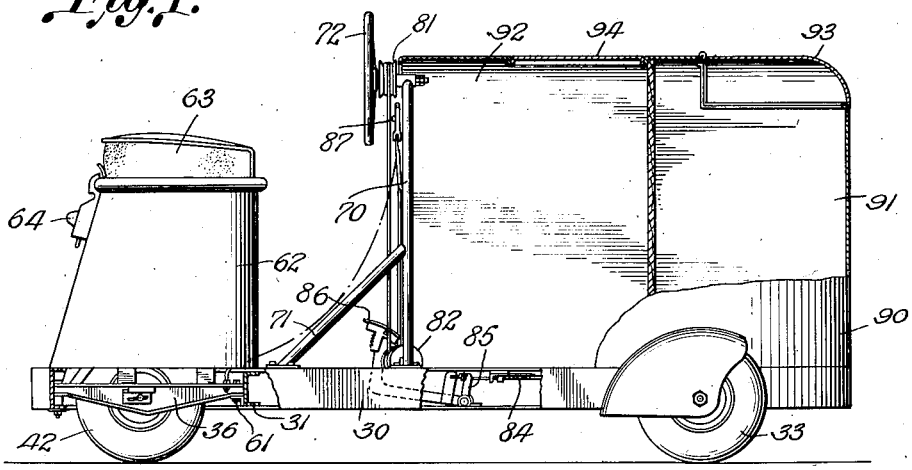
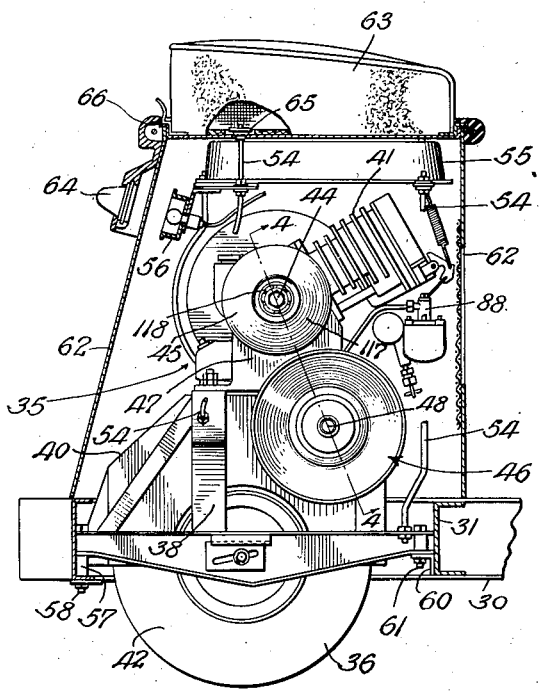
Inventor:
BRUCE BURNS
BY HARRIS, KIECH, FOSTER & HARRIS
ATTORNEYS.

Oct. 28, 1941.  B. BURNS  2,260,797
MOTOR VEHICLE WITH STARTING CLUTCH
Original Filed Jan. 30, 1939   6 Sheets-Sheet 2
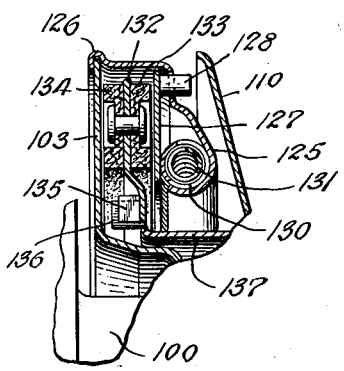
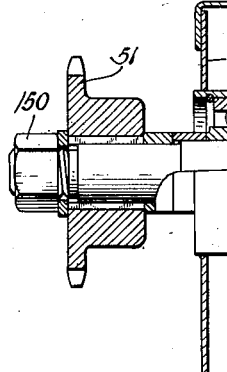
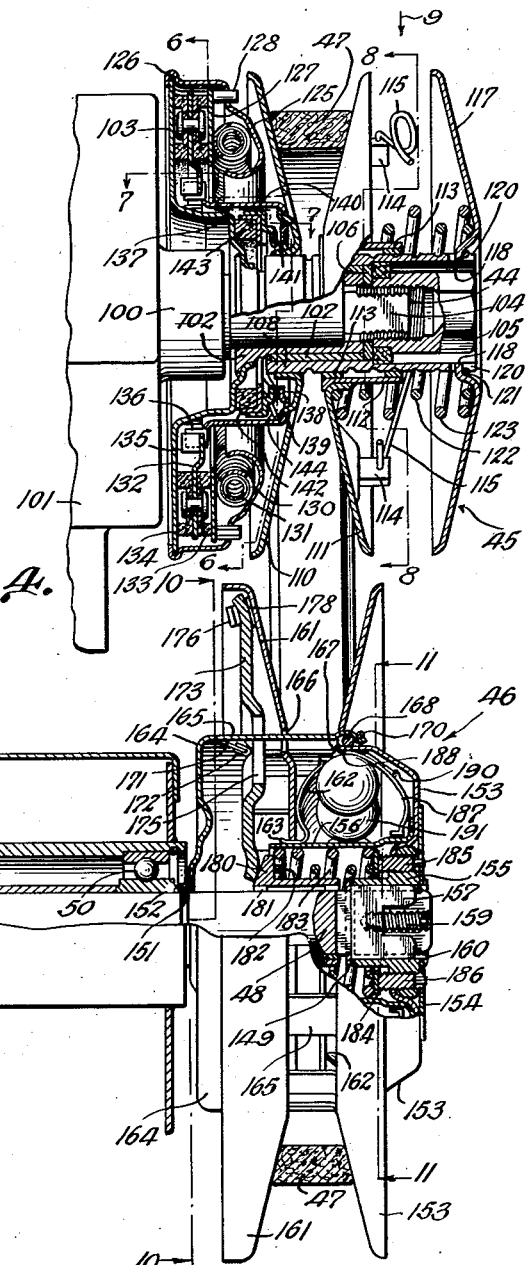
Inventor:
BRUCE BURNS
BY HARRIS, KIECH, FOSTER & HARRIS
FOR THE FIRM
ATTORNEYS.

Inventor:
BRUCE BURNS
BY HARRIS, KIECH, FOSTER & HARRIS
FOR THE FIRM
ATTORNEYS.

Oct. 28, 1941.  B. BURNS  2,260,797
MOTOR VEHICLE WITH STARTING CLUTCH
Original Filed Jan. 30, 1939.  6 Sheets-Sheet 4
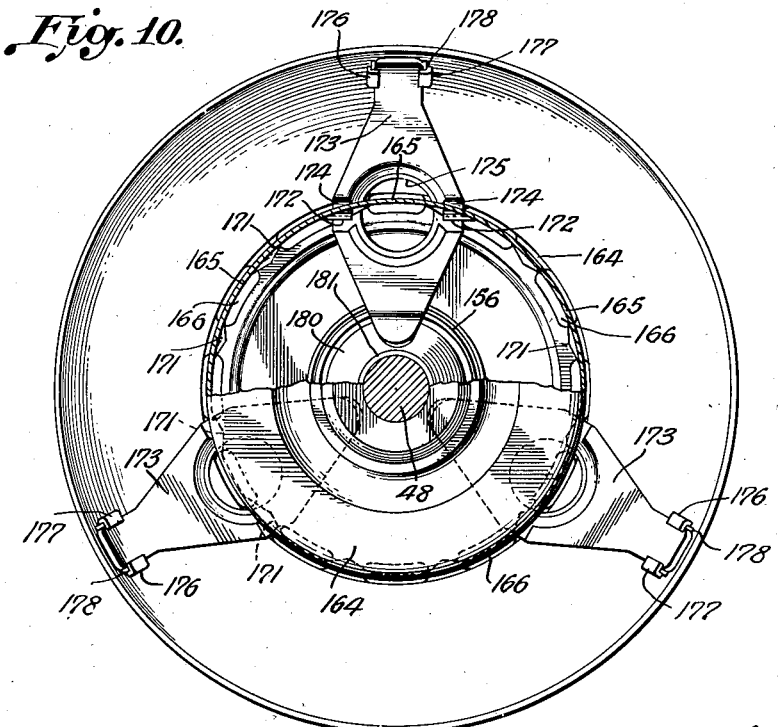
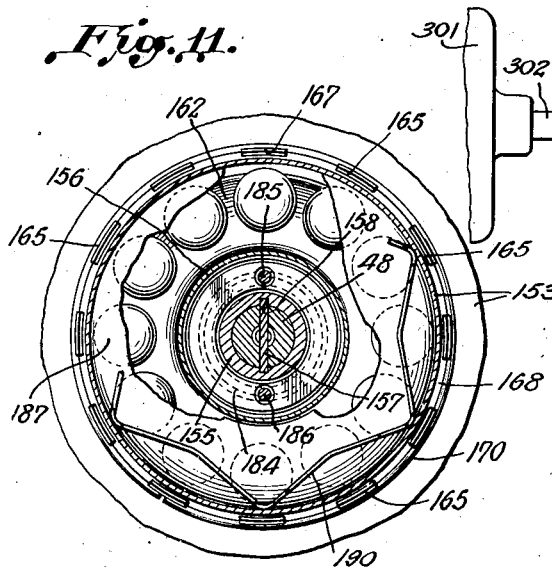
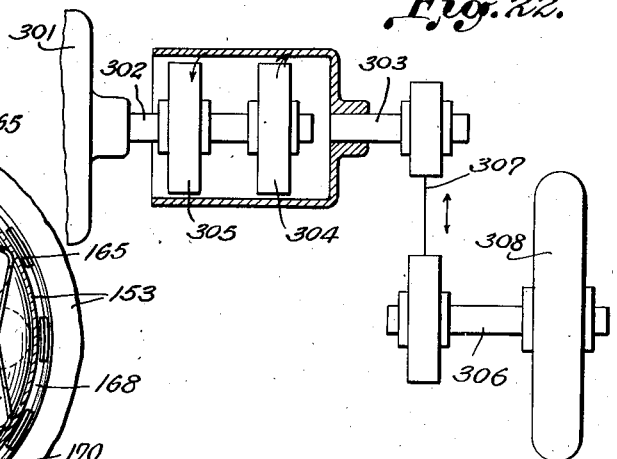
Inventor:
BRUCE BURNS
BY HARRIS, KIECH, FOSTER & HARRIS
FOR THE FIRM
ATTORNEYS.

Oct. 28, 1941.  B. BURNS  2,260,797
MOTOR VEHICLE WITH STARTING CLUTCH
Original Filed Jan. 30, 1939  6 Sheets-Sheet 5
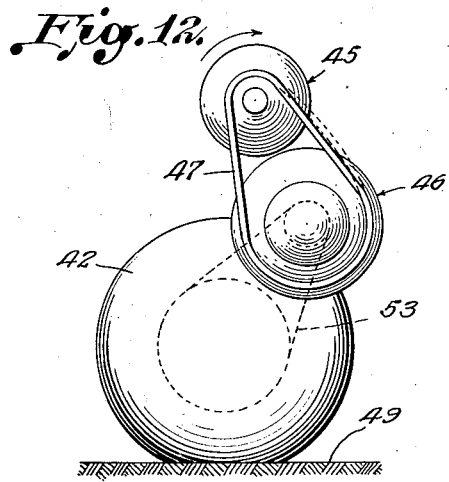
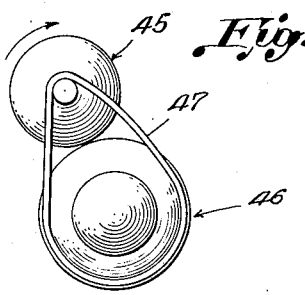
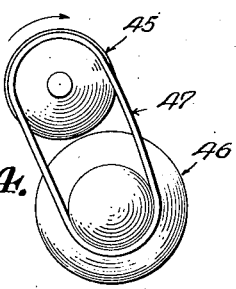
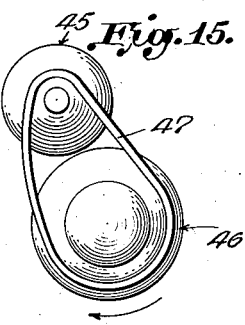
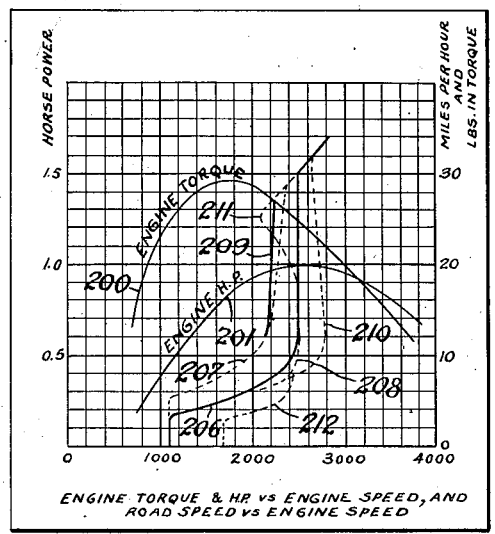
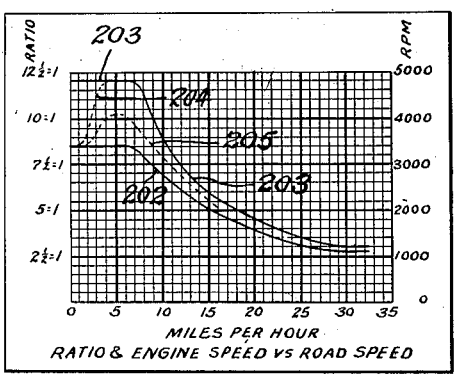
Inventor:
BRUCE BURNS
BY HARRIS, KIECH, FOSTER & HARRIS
FOR THE FIRM
ATTORNEYS.

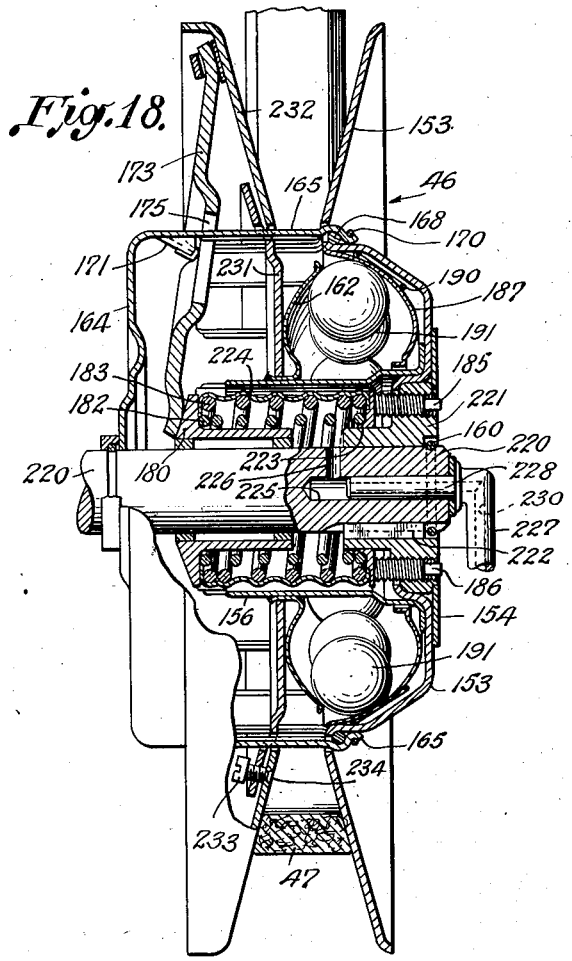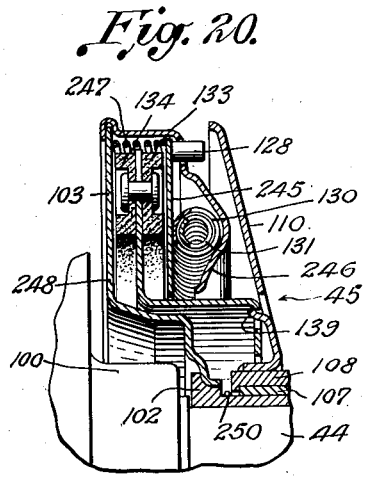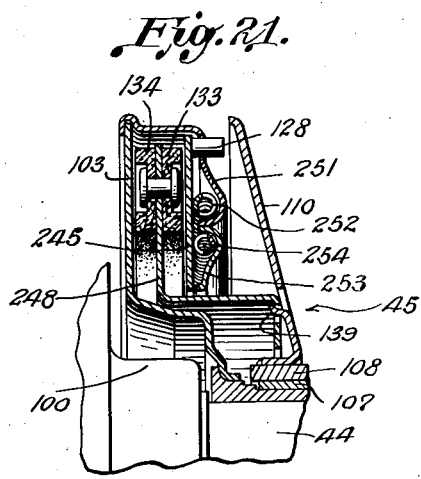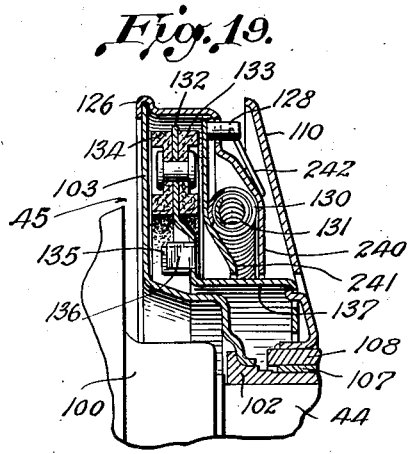

Patented Oct. 28, 1941

2,260,797

UNITED STATES PATENT OFFICE 2,260,797

MOTOR VEHICLE WITH STARTING CLUTCH

Bruce Burns, Santa Monica, Calif., assignor to Salsbury Corporation, Inglewood, Calif., a corporation of California Original application January 30, 1939, Serial No. 253,557. Divided and this application April 29, 1940, Serial No. 332,405

5 Claims. (Cl. 180—25)

The invention claimed herein relates to motor vehicles and is particularly adapted for use in motor vehicles of very light construction and relatively low power, such as the one hereinafter described. Such vehicles are of light weight and it is highly desirable that they be of low cost and of simple construction, and that many of the complicated mechanisms considered necessary in the standard type of automobile be omitted.

It is an object of this invention to provide means by which the internal combustion engine used to drive a motor vehicle may be started without the use of a starting motor or crank.

It is a further object of this invention to provide means by which said engine may be started when the vehicle is stationary and the engine is not rotating by simply pushing the vehicle forward with ignition turned on the engine.

It is a further object of the invention to provide means such that after the engine is so started it can freely rotate without driving the vehicle.

It is a further object of the invention to provide means such that the vehicle can be pulled backward at all times, regardless of whether or not the engine is running, without the engine resisting said backward movement.

It is a further object of the invention to provide means such that as long as the vehicle is in motion the engine is forced to continue rotating.

These and other apparent objects I attain in a manner which will be clear from a consideration of the following description taken in connection with the accompanying drawings, in which Fig. 1 is an elevational view of the motor vehicle embodying my invention;

Fig. 2 is an elevational view of the power plant employed in the motor vehicle of Fig. 1 and the mounting means therefor;

Fig. 3 is an elevational view of the power plant shown in Fig. 2, taken from the opposite side thereof;

Fig. 4 is a cross-sectional view of the automatic power transmission apparatus forming a part of the power plant shown in Fig. 2;

Fig. 5 is a partial cross-sectional view of the main clutch mechanism shown in the idling position;

Fig. 10 is a sectional view of a portion of the apparatus of Fig. 4 taken along the line 10—10 in the direction indicated by the arrows;

Fig. 11 is a sectional view of a portion of the apparatus of Fig. 4 taken along the line 11—11 in the direction indicated by the arrows;

Fig. 12 is a diagrammatic illustration showing, for one adjustment of the apparatus, the position of the belt under idling condition;

Fig. 13 is a diagrammatic illustration showing the belt in extreme "low gear" position;

Fig. 14 is a diagrammatic illustration showing the belt in the extreme "high gear" position;

Fig. 15 is a diagrammatic illustration showing the belt in an intermediate position under conditions in which the vehicle is being moved forwardly before the engine has started;

Fig. 16 is a chart illustrating the performance characteristics of the apparatus of my invention;

Fig. 17 is a chart illustrating the performance characteristics of the apparatus of my invention;

Fig. 18 is a cross-sectional view of an alternative form of the countershaft unit of my apparatus;

Fig. 19 is a cross-sectional view of an alternative form of a portion of the clutch and pulley unit of my apparatus;

Fig. 20 is a cross-sectional view of an alternative form of a portion of the clutch and pulley unit of my apparatus;

Fig. 21 is a cross-sectional view of an alternative form of a portion of the clutch and pulley unit of my apparatus; and Fig. 22 is a diagram of the mechanism hereinafter described.

Figure 6:
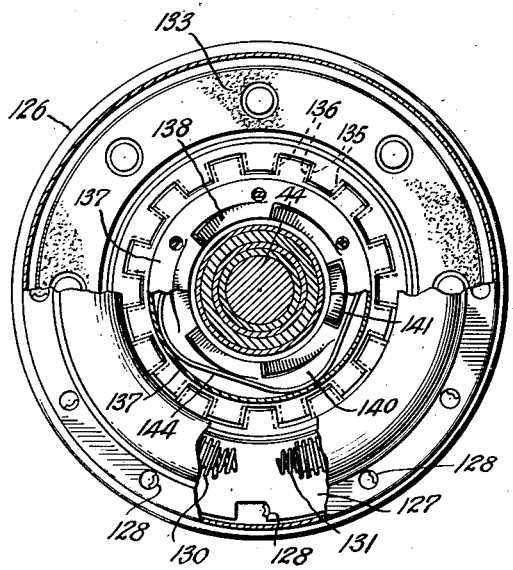
Fig. 6 is a sectional view of a portion of the apparatus of Fig. 4 taken along the line 6—6 in the direction indicated by the arrows.

The motor vehicle of my invention illustrated in the drawings is a small three-wheeled vehicle of light weight, and is especially adapted for use of one person in rapid, light delivery or messenger service. A low hung longitudinal frame is employed comprising an oval-shaped member 30 with cross-bracing members 31, the oval being of larger radius of curvature in the front than in the rear. The vehicle may have a front wheel or wheels 33 through which it is steered by a steering wheel 72. The vehicle is powered by a power plant 35 which is preferably a self-contained unit positioned at the rear of the vehicle. The power plant 35 is preferably supported on a secondary frame structure which includes horizontal frame members 36 and 37 and vertical frame members 38 attached thereto. On this frame structure are directly supported a wheel housing 40 and an engine 41. A wheel 42 is mounted within the housing 40 on an axle 43 adjustably supported by the frame members 36 and 37. Associated with the crankshaft 44 of the engine 41 is an automatic clutch unit 45 which is in driving relation with a countershaft unit 46 through a V-belt 47. The countershaft unit 46 is mounted on a countershaft 48 rotatably supported in bearings 50, in turn supported by the wheel housing 40. The countershaft 48 extends in a transverse horizontal direction through the wheel housing 40 and carries a sprocket 51 on the end thereof opposite to that with which the countershaft unit 46 is associated. The sprocket 51 is in driving relation, through a chain 53, with a sprocket 52, mounted on the axle 43 for rotation with the wheel 42. Vertically extending rods 54 are attached to the frame members 36, 37, and 38 and support a fuel tank 55 and a tail lamp 56.

It will be evident that the entire power plant 35, including the driving wheel, is supported directly or indirectly by the horizontal frame members 36 and 37. The power plant may then be mounted in the vehicle by attaching the members 36 and 37 to the chassis frame. As illustrated, the power plant is located at the extreme rear of the vehicle, the frame members 36 and 37 of the power plant unit being attached at the rear to the oval frame 30 through suitable spacers 57 by bolts 58, and at the front to one of the cross-bracing members 31 through brackets 60 by bolts 61. A cover 62 rests on the frame 30, enclosing the power plant unit 35 and serving as a support for an operator's seat 63 and a tail lamp lens 64. The cover 62 is held down by thumb nuts 65 screwed on the ends of the rods 54 which extend through the top of the cover 62. The seat is retained in position by a spring catch 66. With this construction the power plant unit 35 is always readily accessible and may be removed in one unit, facilitating repair and replacement.

About midway of the vehicle, in a front and rear direction, a vertical, triangular frame 70 is erected on the frame 30 and is braced by members 71. Rotatably supported at the apex of the triangular frame 70 is the steering wheel 72. The driving and control elements of the vehicle are specially adapted to leave unobstructed a large space to the front of the frame 70, and above the frame 30, to provide a carrying space of large volume.

The construction and operation of the automatic power transmission means of my invention will now be considered. The crankshaft 44 of the engine 41 projects from a bearing boss 100 on the side of the crankcase 101 of the engine 41, and carries a hub 102 and a housing 103 which are preferably welded together. A pair of diametrically opposed flat faces 104 milled on the extended end of the crankshaft 44 engages mating flat surfaces in the end of the hub 102 in such manner that the crankshaft 44 and the hub 102 are rotatively keyed together. A nut 105 engages threads on the extended end of the crankshaft 44 and, acting through a washer 106, holds the hub 102 firmly in place on the crankshaft 44. Freely journaled on the cylindrical outer surface of the hub 102, with suitable end clearance, is a bushing 107 which is pressed into and carries a tubular pulley hub 108. An inclined pulley face 110 is welded to the exterior of the pulley hub 108.

Another inclined pulley face 111 opposed to the pulley face 110 is adapted to slide and rotate on the pulley hub 108 and for this purpose the pulley face 111 is welded on a sleeve 112 within which are pressed a pair of spaced, hardened steel bushings 113 which slide on the hardened and ground exterior surface of the pulley hub 108. Three posts 114 are riveted to the pulley face 111 at circumferentially spaced locations, and through a hole in each of these posts a spring 115 passes and is anchored so as to permit it to oscillate in a plane parallel to the axis of the unit 45, but to be retained against the action of centrifugal force. The springs 115 preferably consist of loops of wire pivotally connected at one end to the posts 114 and at the other end connected in a similar manner to posts 116 which are riveted to a dish-shaped housing 117. The housing 117 is formed with a series of circumferentially spaced keys 118 which engage corresponding slots 120 in the end of the pulley hub 108 and are held in place by a snap ring 121 engaging a groove on the pulley hub 108. Compression type helical coil springs 122 and 123 surround the pulley hub 108 and are compressed between the housing 117 and the pulley face 111, thus urging the pulley face 111 toward the pulley face 110 at all times. It is apparent that the pulley face 111 is axially movable relative to the pulley face 110 and the housing 117, but is constrained to rotate therewith by reason of the torque link springs 115.

Referring now to that portion of the unit 45 which functions as an automatic or main clutch, it will be seen that an annular ramp 125 is spun in place at 126 to form an integral unit with the housing 103 and the hub 102. Shrouded within the ramp member 125 is a floating plate 127 which is free to move axially relative to the ramp but is rotatively keyed thereto by fingers 128 which pass through holes in the ramp 125. Disposed annularly between the floating plate 127 and the ramp 125 is a circumferentially resilient centrifugal element, preferably having the form of a grommet spring 130, and preferably consisting of a closely wound spring with its ends hooked together to form a ring and within which is a similar spring 131 of smaller pitch diameter with its ends left free. The grommet spring 130 is preferably so wound and proportioned that when in place within the ramp 125, it retracts itself into firm contact with the curved innermost portion of the ramp. The ramp 125 is so shaped that it approaches the plate 127 as it proceeds outwardly from the axis of rotation, so that enlargement of the grommet spring 130 to a larger radius results in movement of the grommet spring toward the floating plate 127. Located between the floating plate 127 and the housing 103 is a clutch element preferably comprising an annular metal plate 132 having friction faces 133 and 134 riveted to opposite sides thereof. The innermost portion of the plate 132 is sheared and formed to produce a series of spaced teeth 135 which mesh with a mating series of similarly formed teeth 136 on a member 137 which is permanently attached to the concave side of the pulley face 110 by lugs 139 passing through holes in the member 137. As seen best in Fig. 7, the teeth 135 are formed by shearing the innermost edge of the plate 132 radially and bending the adjacent portions away from the line of shear into planes perpendicular to the plane of the plate 132. In this manner a pair of teeth is formed leaving a space between, and this operation is repeated around the edge of the plate to form a series of such pairs of teeth. A similar operation is used to form the pairs of teeth 136 on the outermost edge of the member 137. The teeth on the two mating members are so spaced that a pair of teeth 136 fits with suitable clearance in the space left by bending out a pair of the teeth 135, all of the teeth being directed in the same direction. It will be evident that this toothed connection compels the plate 132 and the member 137 to rotate together while permitting the plate 132 to move axially with respect to the member 137. In addition to the main clutch above described, I provide a starting clutch which will now be described.

Figure 7:
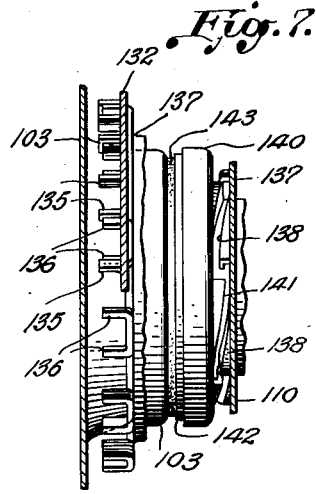
Fig. 7 is a sectional view of a portion of the apparatus of Fig. 4 taken along the line 7—7 in the direction indicated by the arrows.

The member 137 is formed along its innermost edge with inclined teeth 138 which are preferably punched out therefrom, as shown in Fig. 7. The inclined teeth 138 preferably have about a 6° lead angle and have engaging surfaces that extend toward the housing 103 as one progresses in a direction opposite to the direction of rotation of the engine crankshaft 44. A cup-shaped member 140 is shrouded within the member 137 and has formed along its innermost edge a series of inclined teeth 141 opposed to and adapted to mate with the inclined teeth 138. Within the member 140 is pressed a cup 142 which carries an annular ring 143 of friction material. A wave-form or marcel spring 144 of small wire is so preformed and positioned to bear on the member 140 and the member 137 to force the friction material 143 into contact with the housing 103. It will be noted that the pressure of the spring 144 also tends to hold the pulley face 110 in the extreme rightward position, as shown in Fig. 6.

In the operation of the unit 45, that part of the apparatus lying between the housing 103 and the member 137 serves primarily to permit starting of the engine 41 by simply moving the vehicle forward. In lightweight two-wheel and three-wheel vehicles of the type to which transmissions of the character of that herein disclosed are most readily applicable, it is often inconvenient and expensive to provide conventional electric starting mechanisms, and it is usually inconvenient, if not undesirably expensive, to provide kick starters or hand cranks. The apparatus of my invention thus overcomes the inherent disadvantages of the above mentioned types of starting through provision of the overrunning clutch starting mechanism described above.

As illustrated in the drawings, the engine is considered to rotate in a clockwise direction as viewed from the right side in Fig. 4. It is apparent that forward motion of the vehicle with the engine stationary, therefore, results in similar clockwise rotation of the pulley face 110 under the influence of the V-belt 47. The inclined teeth 138 are, therefore, moved in a clockwise direction. Since the friction material 143 is held against the housing 103 by action of the marcel spring 144, the member 140 and the inclined teeth 141 lag behind the inclined teeth 138 and are thus brought into engagement therewith. Continued forward motion of the vehicle and resultant clockwise rotation of inclined teeth 138 acts by reason of their inclination to the plane of rotation, to urge the member 140 and the friction material 143 into closer and closer contact with the housing 103 until a sufficiently great frictional force between material 143 and housing 103 is produced to cause rotation of the housing 103, hub 102 and crankshaft 44 of the engine 41. Continued rotation of the engine crankshaft causes the engine to start.

After the engine has started, if the pulley face 110 be moving slowly, as is usually the case, the engine even at idling speed will rotate faster than does the pulley assembly, with the result that the inclined surfaces of the teeth 141 will be rotated out of engagement with the inclined surfaces of teeth 138 and the radial ends of teeth 141 will engage the ends of teeth 138. This leaves the force of the marcel spring 144 as the only force tending to maintain the frictional connection between the material 143 and housing 103. This force is small compared to that required to transmit the torque necessary to move the vehicle, so, with the vehicle stationary, the engine is permitted to idle freely, restrained only by the very slight braking effect caused by contact of the friction face 143 with the housing 103 under the small axial force of the marcel spring 144.

Not only does the above described starting mechanism permit starting the engine by pushing the vehicle forward, but it also insures against the engine stalling when the centrifugal clutch is disengaged while the vehicle is still moving forward under its momentum, for under these conditions the vehicle will drive the engine through the inclined teeth 138 and 141.

This mechanism also acts as an overrunning clutch to permit the vehicle to be pushed backward freely without rotating the engine, which is often of advantage in maneuvering in close quarters. When the vehicle is moved backwardly the inclined teeth 138 will be rotated in a counterclockwise direction as viewed from the right in Fig. 7 and the radial faces of the teeth 138 and 141 will engage, causing the member 140 to be rotated in a counterclockwise direction also. The frictional force between the friction face 143 and the housing 103, being the result of only the axial force of the marcel spring 144, is insufficient to transmit any considerable amount of torque, so for all practical purposes the engine is left free to idle or remain stationary while the vehicle is moved backward.

Following starting of the engine as described above, the unit 45 is adapted through a centrifugal clutch action to automatically connect the engine to the pulley 110—111 to drive the vehicle when the speed of the engine exceeds a certain predetermined value. When the crankshaft 44 of the engine is rotating, the hub 102, the housing 103, the ramp 125, and the floating plate 127 rotate as a unit. When the speed of rotation is low, as in idling of the engine, the parts occupy positions as shown in Fig. 5. The extended annular coil spring 130 is nested within the ramp 125 and rotates with the ramp. In the position shown in Fig. 5 the spring 130 exerts no axial force on either the floating plate 127 or the ramp 125, permitting the plate 132 to remain stationary while the other clutch elements rotate about it. The spring tension and total weight of the grommet spring are so balanced that, in the normal idling range of the engine, it will remain in the retracted position shown in Fig. 5, but upon increase of engine speed appreciably above the idling range centrifugal force acting upon the grommet spring will expand it radially to a greater circumferential length. As the grommet spring moves outward it is forced in the direction of the floating plate 127 by the frusto-conical surface of the ramp 125, and moves the floating plate 127 into contact with the friction face 133. Continued expansion of the grommet spring 130 causes the plate 132 to be moved until the friction face 134 contacts the housing 103, when the plate 132 will tend to be driven by frictional contact with a moving surface on either side. The clutch in the engaged position is shown in Fig. 4.

Gentle engagement of the clutch, with slippage, thus begins at some predetermined speed above the normal idling range, and increase of engine speed above this value increases the axial force due to the centrifugal expansion of the grommet spring 130, this in turn increasing the clutch torque until a point is soon reached at which no further slippage between the friction faces 133, 134, and the rotating surfaces 103, 127 in contact therewith will occur even under full throttle torque of the engine. Rotation of the plate 132 during engagement of the clutch is, by reason of the engagement of the teeth 135 and 136, accompanied by rotation of the member 137 and the pulley face 110 connected therewith.

It will be evident that torque is transmitted through the pulley hub 108, housing 117 and torque link springs 115 to also rotate the pulley face 111. As the clutch is engaged, then, the vehicle moves forward and the clutch remains engaged until, due to the closing of the throttle or increase in resistance to motion of the vehicle, the engine speed drops below the speed at which the clutch initially locked in. When the speed drops below this value, the clutch again slips.

If the engine is slowed down due to increased resistance to motion of the vehicle, as in climbing a hill or pulling a heavy load, the clutch will slip under full engine torque, transmitting this torque to the rest of the transmission and holding the engine speed down to a speed slightly below the one at which locking in of the clutch normally occurs. If the increase in resistance to travel be sufficient to completely stop the vehicle, the clutch will continue to slip under full engine torque, but it will be impossible to stall the engine. If, however, the engine speed be intentionally reduced by closing the throttle, the clutch will disengage as the engine speed drops back through the engaging range into the normal idling range and the engine will then idle freely. The engine speed at which the clutch starts to engage as well as that at which it finally "locks in" for any particular engine torque may be readily predetermined by proper balance of the weight of the grommet spring 130, the initial tension of the spring, and the shape of the ramp 125. Individual or combined variation of these factors permits predetermination of engaging and locking-in speeds over an almost unlimited range.

It might appear that wearing of the friction faces 133 and 134 would cause an increase in the radius of the grommet spring 130 at which it produces engagement of the clutch and that the speed at which clutch engagement takes place would, therefore, be altered as wearing of the friction faces occurs. But, since the centrifugal force on the grommet spring increases directly in proportion to the radius of the grommet spring and the resisting force of the spring also increases as a function of the increase in radius, the outward movement of the spring resulting in engagement of the clutch may, by proper proportioning of the mass and spring tension of the grommet spring in combination with proper shaping of the inclined face of the ramp 125, be made to depend only on the speed of rotation of the grommet spring. And since the centrifugal force varies as the square of the speed of rotation, the speed at which the centrifugal force overcomes the tension of the grommet spring may be fixed with considerable accuracy. By proper proportioning of the cooperating elements, then, the speed at which the clutch engages may be predetermined almost independently of relative axial positions of the elements and independent of wear of the friction faces 133 and 134.

In addition to the main clutch through which the engine is connected and disconnected to the mechanism driving the wheel 42 and the starting clutch through which the engine may be started by pushing the vehicle forward, I provide an automatic speed reduction gear which operates through the V-belt 47, and which will now be described.

The automatic clutch unit 45 drives the countershaft unit 46 through the V-belt 47, the two units 45 and 46 comprising an automatic transmission adapted to vary the effective transmission ratio as the vehicle speed changes, the ratio of engine speed to wheel speed being high for low speeds of the vehicle and being decreased as the vehicle speed increases. The countershaft unit 46 is mounted on the countershaft 48 which is supported in the bearings 50 retained in the wheel housing 40, and is restrained against motion along its own axis by a nut 150 bearing against the sprocket 51 at one end of the wheel housing and by a snap ring 151 and a shroud 152 cooperating with a groove in the countershaft at the other end of the wheel housing. On the end of the countershaft 48 is mounted a pulley face and housing member 153, a disc 154, a hub 155, and a sleeve 156, all welded into one unit. The hub 155 is fitted to the countershaft 48 and is rotatively connected thereto by a key 157 which is positioned in a diametric slot in the countershaft 48 and engages diametrically opposed keyways 158 in the hub 155. A snap ring 160 cooperating with a groove in the countershaft 48 restrains the hub 155 from outward axial movement. For the purpose of compensating for belt wear, as hereinafter described, a washer 149 is positioned surrounding the shaft 48 and is limited in its rightward travel by abutment against the end of the key 157. The rightward travel of the key 157 in turn is determined by the adjustment of a screw 159 in threaded engagement with the shaft 48 and bearing against the key 157.

An axially movable inclined pulley face 161 is opposed to the pulley face 153 so as to cooperate therewith in providing inclined contact surfaces for the belt 47, and is piloted on the sleeve 156 by the inner tubular portion of an annular ramp 162 which is attached to the pulley face 161 by bending over the end portion 163 thereof. A cylindrical cage 164 is piloted on the countershaft 48 adjacent the snap ring 151 and comprises a series of circumferentially spaced fingers 165 extending through circumferentially spaced apertures 166 in the pulley face 161 and apertures 167 in the pulley face 153. The inwardly bent ends of fingers 165 are projected over a snap ring 168 surrounding the cylindrical housing portion of the pulley face 153, and are clamped, so as to attach the cage 164 to the pulley face 153, by a closed clamping ring 170 which is sprung over and seated in the outwardly turned ends of fingers 165. Between the fingers 165 the interrupted cylindrical edge of the cage 164 is bent inwardly with a V-shape at suitable angles to provide a series of aligned pairs of fulcrum edges 171. U-shaped shoes 172 of suitable abrasion-resistant metal are slipped over the fulcrum edges 171. Pivoted about the fulcrum edges 171 are a plurality of equalizer arms 173, preferably three in number and equally spaced around the cage 164, which are grooved at 174 to provide bearing grooves for the fulcrum edges, and apertured at 175 to permit a finger 165 of the cage to pass through. The curved outermost ends of these arms engage the back side of the pulley face 161 and are restrained against circumferential and axial movement relative to the pulley face by fingers 176 and 177 which form a part of the pulley face and which are bent over the sides of the equalizer arms 173 to permit free radial movement of the ends of the arms along the pulley face. Shoes 178 of abrasion-resistant sheet metal are retained by the fingers 176 and 177 and interposed between the ends of the equalizer arms and the back of the pulley face 161 to permit relative sliding motion of these parts without lubrication. The innermost ends of the equalizer arms 173 bear against the frusto-conical end of a member 180 which is slidably mounted on the countershaft 48. Hardened steel rings 181 are pressed into the member 180 to provide bearing surfaces in contact with the countershaft. The member 180 is urged in the direction of the equalizer arms 173 by resilient means, preferably comprising two compression springs 182 and 183 of different pitch diameters positioned in the space surrounding the cylindrical portion of member 180 and within the sleeve 156, and bearing at one end against the member 180 and at the other end against a washer 184 which abuts diametrically opposed adjusting screws 185 and 186 threaded through the hub 155. By means of the adjusting screws 185 and 186 the compression of the springs 182 and 183 may be changed.

It is evident that the force of the springs 182 and 183 acting through the member 180 against the inner ends of the equalizer arms 173 keeps these arms in firm engagement with the fulcrum edges 171 at all times and results in the outer ends of the arms 173 exerting a force on the pulley face 161 tending to move it toward the opposed face 153. Since all three arms 173 are acted upon equally, force is evenly applied to the pulley face 161 and the entire pulley face is moved evenly in an axial direction. The force against the fulcrum edges 171 holds the cage 164 against the shroud 152 and the snap ring 151, so that the cage is fixed in position relative to the pulley face 153. The reaction of the springs 182 and 133 against the washer 184 and the screws 185 and 186 holds the hub 155 firmly in place against the snap ring 160.

Within the housing portion of the pulley face member 153 is situated an annular ramp 187 which is loosely piloted at its central hole on the sleeve 156 and more snugly piloted at its periphery by the shoulder 188 of the pulley face member 153. Between the ramp 187 and the pulley face 153 a marcel spring 190 is compressed so that it has a slight tendency to move the ramp 187 toward the opposed ramp 162. Confined between the opposed ramps 162 and 187 is a plurality of steel balls 191 which engage the ramps 162 and 187 on either side. The ramps 162 and 187 are so shaped that the axial separation therebetween diminishes with increasing distance from the countershaft 48, and so that they never open far enough apart to permit the balls 191 to pass out of confinement between the ramps. The tendency of the springs 182 and 183 is to cause the pulley face 161 to approach the pulley face 153, thus bringing the ramps 162 and 187 nearer together and reducing the diameter of the circle of balls 191. The balls 191 are preferably of such diameter and in such number that when the unit 46 is not in rotation the balls lie in an annular ring closely around the sleeve 156 with each ball lightly pressed against the adjacent balls by the tendency of the two ramps to approach one another. Rotation of the unit 46 causes the balls 191 to fly outwardly against the ramps 162 and 187, forcing the ramp 162, and with it the pulley face 161, away from the pulley face 153 to a point where the increased force of springs 182 and 183 is sufficient to balance the centrifugal force on the balls 191. When the countershaft 48 is rotating, then, the position of the pulley face 161 relative to pulley face 153 is determined by the centrifugal force on the balls 191 which in turn is a measure of the speed of rotation of the countershaft, or the speed of the vehicle.

The operation of the countershaft unit 46 in cooperation with the clutch and pulley unit 45 and the V-belt 47 as an automatic transmission will now be considered. If the springs 182 and 183 are substantially compressed by inward adjustment of the screws 185 and 186, they preferably exert sufficient force in their extended position to urge the pulley face 161 toward the pulley face 153 with a greater force than that with which the pulley face 111 is urged toward the pulley face 110 by the springs 122 and 123 when in their compressed position. Therefore, when the vehicle is in slow motion and the units 45 and 46 are rotating, the pulley face 161 will be moved to the closest permissible position relative to the pulley face 153, being limited by abutment of the inner ends of the arms 173 with the cage 164, or by the belt 47 coming to the position of minimal pitch diameter on the unit 45. The belt 47 will be forced to near the outer periphery of the pulley faces 153 and 161, causing it at the same time to move inwardly between the pulley faces 110 and 111 of unit 45 to occupy a position close to the pulley hub 108, and forcing the pulley face 111 away from the pulley face 110 against the force of the springs 122 and 123. Under these circumstances the transmission is in "low gear"; that is, it is in a condition wherein it provides the greatest ratio between engine speed and countershaft speed, or between engine speed and wheel speed.

If the throttle of engine 41 be opened and the vehicle started forward by engagement of the clutch in the manner previously described, the vehicle will move forward in this low gear position. As the wheel speed increases, increase in rotational velocity of the countershaft 48 will subject the balls 191 to centrifugal force which will cause them to move outward against the confining ramps 162 and 187 and move the pulley face 161 away from the pulley face 153 against the force of the springs 182 and 183, as previously described. This will permit the belt 47 to move to a lower pitch diameter on the unit 46, to which position it will be forced by reason of the belt moving to a larger pitch diameter on the clutch and pulley unit 45 through action of the springs 122 and 123 in urging the pulley face 111 toward the pulley face 110. In this condition the parts may occupy positions as illustrated in Fig. 4, in which the ratio of engine speed to wheel speed has been reduced from that corresponding to the low gear condition.

Still further increase in wheel speed will result in further increase in centrifugal force on the balls 191, with resultant increase of the axial force tending to separate the pulley faces of the countershaft unit 46. This permits the belt 47 to be brought to a smaller pitch diameter on the unit 46 and to a larger pitch diameter on the unit 45, thus still further reducing the effective transmission ratio. When the wheel speed becomes sufficiently great, the pulley face 161 will be displaced to the position of greatest permissible separation in which the member 180 abuts the washer 149 and the belt 47 lies adjacent the fingers 165 on unit 46 and close to the periphery of pulley faces 110 and 111 of unit 45, the transmission then being in the condition providing the smallest permissible ratio of engine speed to wheel speed, that is, in "high gear" condition.

It is evident that when the vehicle slows down, relative motion of the various parts will occur in the reverse direction and, when the vehicle comes to a standstill, the belt 47 will again be in the position of greatest permissible pitch diameter on the countershaft unit and the balls 191 will again be retracted to their smallest pitch circle. It will also be apparent that the speed at which the centrifugal force on the balls 191 first overcomes the resultant spring force and produces shifting of the speed ratio of the transmission and the speed at which the transmission finally reaches the "high gear" condition may be adjusted by moving the screws 185 and 186 inwardly to increase the initial load upon the springs 182 and 183, or outwardly to reduce this initial tension. The transmission may thus be adjusted as desired to various road, load and driving conditions, and by proper proportioning of the parts, almost any type of variation of the effective transmission ratio as a function of vehicle speed may be obtained.

While the foregoing description of the operation of the transmission explains the manner in which it changes the transmission ratio in response to vehicle speed, the transmission is preferably also adapted to vary the transmission ratio as the engine torque changes, in such manner as to render the overall performance of the transmission much more suitable for propulsion of motor vehicles than if ratio change were determined solely by vehicle speed. The variation of transmission ratio with engine torque is principally a result of the positions assumed by the belt 47 relative to the pulleys of the units 45 and 46 when torque is being transmitted.

In the diagrammatic illustration of Fig. 12, the vehicle wheel 42 is represented as resting on the ground 49 and is driven from the countershaft unit 46 by the chain 53. The belt 47 connects the clutch and pulley unit 45 with the countershaft unit 46. The direction of rotation is indicated by the arrow. In this view, the belt 47 is represented in an intermediate position about one-third the way from the position of minimal pitch diameter on unit 45, represented in Fig. 15, to the position of maximal pitch diameter on unit 45, represented in Fig. 14. Preferably the springs 122 and 123 in the unit 45, and the springs 182 and 183 in the unit 46 are so proportioned and adjusted that they balance one another in their effect upon the transmission when the belt is approximately in the position represented in Fig. 12, and the vehicle is at rest or travelling at low speed, in such manner as to make this belt position one of equilibrium. In Fig. 12, if torque is being exerted by the engine in the direction indicated by the arrow, the belt 47 will be under tension on the left side, as shown, and will be relatively slack on the right side and may even loop outward as indicated by the dotted lines. With this belt condition, as rotation progresses, the taut side of the belt will tend to creep to a smaller pitch diameter where it feeds into the pulley of unit 45. At the same time, the relative slack in the right side of the belt will permit this portion to creep to a larger pitch diameter on the countershaft unit 46. Depending upon the balance of forces involved, the degree to which the belt leaves the normal position of Fig. 12 may vary over a wide range. One balance of forces which gives very desirable results in the type of vehicle under consideration is that in which movement of the vehicle at low-speed through a distance of a few feet under full engine torque or clutch slipping torque will cause a shift of the belt into the position shown in Fig. 13, representing the extreme low gear position. This position is one which the transmission will automatically assume if the vehicle encounters road resistance such as to slow it down to the point that the centrifugal balls in the countershaft pulley exert little or no axial force. Since the transmission under these conditions would be expected to assume the position of Fig. 12, which is determined solely by balance of opposed spring forces, the additional and very substantial increase in overall reduction gained by the creeping of the belt into the position of Fig. 13 gives the vehicle greatly improved hill climbing characteristics.

If the vehicle is at rest with the transmission in the balanced position of Fig. 12 and the throttle is slowly opened and the vehicle gradually accelerated and brought up to speed, the creeping tendency just described will be largely minimized since the belt tension will be low and the forces tending to cause creeping will be proportionally low. In this case the vehicle will start forward in what may be termed an intermediate ratio and as road speed increases and the centrifugal forces on the balls in the countershaft unit 46 result in axial force on the movable pulley face of this unit, the transmission will shift into the position shown in Fig. 14. If, however, from a static position, as in Fig. 12, the vehicle is rapidly accelerated by full opening of the throttle, the relatively high belt tension will result in rapid creep into the position of Fig. 13 in the first few feet of forward movement, and even at low road speed the engine may rotate at such a speed that it delivers its maximal power output. This permits most rapid acceleration for any particular engine and weight of vehicle. As soon as the engine speed reaches a peak value, the increase in wheel speed which corresponds to this increase in engine speed creates such centrifugal force on the balls of the countershaft unit 46 that gradual shifting of the transmission ratio occurs, the shifting of ratio continuing with increase of wheel speed until the transmission is again in the position shown in Fig. 14. It will thus be seen that for hill climbing or maximal acceleration the transmission will automatically assume the lowest possible gear (highest ratio of engine speed to wheel speed) at low wheel speed and will permit utilization of full engine power at these speeds. If, however, conditions make it unnecessary or undesirable to accelerate the vehicle as rapidly as possible, it may be accelerated more gradually under lower engine torque and without the necessity of such high engine speed for any particular wheel speed.

Under normal traffic conditions, when the vehicle comes gradually to a stop, the transmission will return from the high gear position of Fig. 14 to the balanced position of Fig. 12, and upon starting of the vehicle the transmission may either rapidly drop into low gear position and then shift into the intermediate and high gear range, or it may start in the intermediate position and shift into the high gear range, depending upon whether the throttle is fully or only partly opened. If the operator of the vehicle desires that it should be ready to start immediately in the extreme low gear position, thus permitting maximal acceleration for starting from the standing position, he may anticipate his desire by bringing the vehicle to a stop with the throttle partly opened, using the brake, if necessary, to stop the vehicle. When this is done the transmission will be subject to a forward driving torque while the vehicle is being stopped and will shift into the extreme low position in the same manner it would upon encountering any other type of tractive resistance.

It is clear that if the vehicle is operating at high wheel speed with the belt 47 in a position of maximal pitch diameter on the pulley of the unit 45, as shown in Fig. 14, and the direction of applied torque is as indicated by the arrow, a slack loop will under these conditions appear on the right side of the belt. The amount of slack which appears in this loop depends upon belt tension or engine torque. Under light engine loads, little slack will appear, but under conditions of high torque the belt will tend to creep to a somewhat smaller diameter upon the pulley of unit 45 and feed more slack into the loop 89. Thus, when the vehicle is operating in the high speed range at light engine load and torque, the ratio of engine speed to wheel speed will be a minimum, but, if engine torque is increased for the purpose of acceleration or hill climbing, reduction of effective pitch diameter on the pulley of the unit 45 will cause a change in the transmission ratio to increase the mechanical advantage of the engine.

Another manner in which the creeping tendency of the belt is utilized, in this case to improve the ease with which the vehicle may be started by pushing it forward, is shown in Fig. 15. This figure presents the condition which exists when the vehicle has previously come to rest with the pulleys and belt in the balanced position of Fig. 12, and is then being pushed forward with the engine at rest. Applied torque is as indicated by the arrow and the right side of the belt is now under tension and the left side of the belt exhibits a certain amount of slack. As soon as the engine starts to rotate, the creeping tendency will cause the belt to seek a smaller pitch circle on the pulley of the countershaft unit 46 and a larger pitch circle on the pulley of the unit 45, thus increasing the mechanical advantage and diminishing the force necessary to push the vehicle ahead. Ordinarily the engine will start in three or four turns before the effect of creep has caused much change in ratio, but if for any reason the engine fails to readily start, the decrease in ratio of engine speed to wheel speed caused by continuing creep, with resultant decrease in effort required to push the vehicle, is a pronounced advantage.

The manner in which belt creep permits advantageous change of transmission ratio in response to torque conditions independent of wheel speed, depends upon the face angles of the pulleys and belt, the particular pitch diameter at which the belt is operated on each pulley, the load exerted by the springs tending to force the pulley faces together, and upon the force constants of these springs. These factors may be varied over a wide range to increase or diminish or vary the character of the response to torque.

Figure 8:
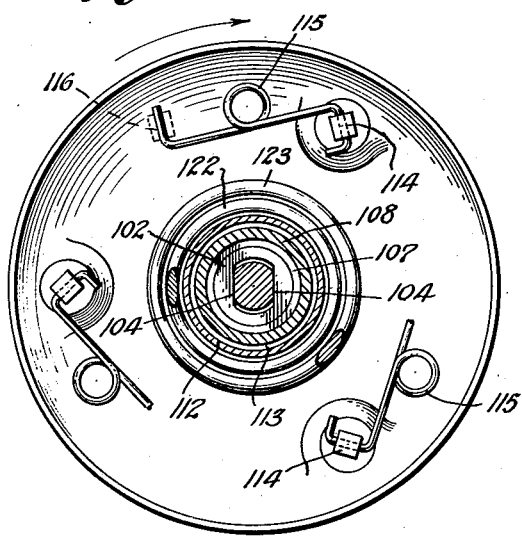
Fig. 8 is a sectional view of a portion of the apparatus of Fig. 4 taken along the line 8—8 in the direction indicated by the arrows.
Figure 9:
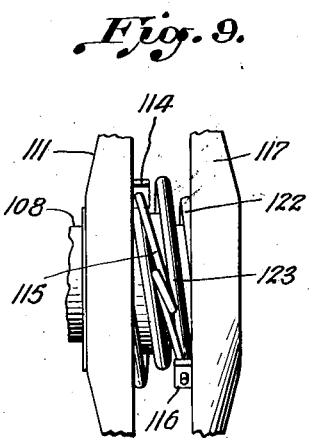
Fig. 9 is a partial view of the apparatus of Fig. 4 from above, as indicated by the arrow 9.

In the embodiment of my invention illustrated herein, a further control element has been introduced in the construction to accentuate the creeping tendency of the belt under certain conditions of operation and to reduce it under certain other conditions, thus further improving vehicle performance. Reference to Figs. 4, 8, and 9 will show that the torque link springs 115 of the unit 45 are normally installed so that they are under compression when driving torque, applied to the housing 117 by the pulley hub 108, is transmitted through the posts 116 into the springs 115. It will be clear that when the springs 115 are angularly disposed relative to the plane of rotation of the unit, the compressive force in the springs 115 under forward driving torque will have an axial component tending to move the pulley face 111 in an axial direction which is dependent upon whether the springs 115 diverge at an angle to the left or to the right from the plane of rotation. The parts of the unit 45 are preferably so proportioned and positioned relative to one another that the springs 115 lie parallel to the plane of rotation when the movable pulley face 111 occupies a position consistent with the position of the belt in Fig. 12. When the pulley face 111 is moved to the right from this position toward the condition represented in Fig. 13, the axial component of the force of springs 115 is such as to move the movable face 111 still farther to the right; while if the pulley face 111 is moved to the left from the normal position, the axial component of the force of springs 115 is in such a direction as to move the pulley face still farther to the left.

Reconsideration now of the creeping of the belt at low speed and high torque from the balanced position of Fig. 12 to the extreme low gear position of Fig. 13, will show that the increasing axial component of the force of springs 115 as the pulley faces separate tends to augment the creeping effect and to make the transmission shift into extreme low gear more rapidly with increase of torque. Similar analysis of the creeping tendency, which will exist under increase of torque in the high speed range, will show that the axial force of the torque links 115 is opposed to the normal creeping tendency so that the change of transmission ratio under increase of throttle when the transmission is in high speed positions is less than it would be if the torque were transmitted through a straight key and keyway or other device which is free of axial reaction as a function of torque. It will be evident, then, that under low speeds and severe conditions of pulling, the mechanism is more responsive in transmission ratio change to increase of tractive effort and increase of engine torque than in the high speed range. In a vehicle where the power is limited and it is important to obtain maximal hill climbing characteristics and maximal tractive effort at low speed, the advantage of such an arrangement is obvious.

Figs. 16 and 17 present curves illustrating the performance of the transmission of my invention when adapted to one specific application. In this application a Johnson X301 "Iron Horse" engine was used. Curve 200 shows the manner in which the torque of this engine varies with engine speed, and curve 201 shows the manner in which the engine horse power varies with engine speed. It will be noted that the engine has a maximal torque of about 29 pounds-inches at 1700 R. P. M., and a maximal horsepower at 1.0 at about 2500 R. P. M. Curve 202 shows the manner in which the ratio of engine speed to wheel speed in the particular application under consideration varies in response only to vehicle speed. This curve starts from an intermediate ratio of 8.5 to 1, corresponding to the balanced position of the V-belt on the pulleys with the vehicle stationary, as shown in Fig. 12, and remains at this ratio until the vehicle speed is about 5 miles per hour, beyond which the ratio gradually decreases to a value of about 2.75 to 1 at 30 miles per hour. The curve 202 then presents what might be termed the "no load" change of ratio which would be obtained if the vehicle could be accelerated from a standing position to its maximum speed without actual application of driving torque or building up of tension on the V-belt.

Curve 203 shows the manner in which the change in transmission ratio takes place under full engine torque, assuming that the vehicle starts with the transmission in the extreme low gear position. Under these conditions the transmission ratio will start at about 12 to 1 and remain at this value until the vehicle attains a speed of about 5 miles per hour. When this speed is reached, the centrifugal forces acting upon the unit 46 will induce a change of transmission ratio, and if the vehicle proceeds under full throttle, the change of ratio will be complete at about 30 miles per hour and the final high speed ratio will be about 3 to 1. The displacement of the curve 203 from the curve 202 is a reflection of the change in transmission ratio produced by the previously discussed creeping tendency of the belt.

Curve 204 shows the transmission curve corresponding to a start under full throttle from the intermediate balanced ratio position illustrated in Fig. 12. It will be noted that the ratio of engine speed to wheel speed increases rapidly while the vehicle is being accelerated to 5 miles per hour, beyond which if acceleration is continued under full throttle operation, the ratio change, of course, follows that of curve 203.

It will be evident that operation of the vehicle with partial throttle openings would be indicated by curves lying between curves 202 and 203, and that a typical curve for ratio change under moderate acceleration might be one such as curve 205.

Curve 206 represents the variation of engine speed with vehicle speed under conditions corresponding to the maximal acceleration curve 203, and may be understood from the following description of the action taking place. The engine under consideration has a normal idling range of from 800 to 1050 R. P. M. and the clutch is adjusted to start engagement at an engine speed of approximately 1100 R. P. M. Following engagement of the clutch, the engine speed stays at about this value until the vehicle speed has reached about 3 miles per hour. During this period the clutch at first slips considerably, but as the speed of the vehicle approaches 3 miles per hour, the slipping diminishes and slight increase in vehicle speed above 3 miles per hour then permits the engine to accelerate with almost no slip, the clutch finally locking in at about 1400 R. P. M. and 4 miles per hour. From 4 miles per hour to a speed of about 8 miles per hour, engine speed varies almost directly as vehicle speed. It will be noted that this portion of the curve 206 is practically a straight line and that in the corresponding portion of curve 203 there is very little change in ratio. When vehicle speed reaches 8 or 9 miles per hour, relatively rapid change of ratio occurs with the result that, although the vehicle accelerates rapidly to a much greater speed, there is only a small increase in engine speed. When the vehicle reaches a speed of about 12 miles per hour, the change of transmission ratio continues according to such a function of increasing vehicle speed that the engine speed remains substantially constant at 2500 R. P. M. and full engine power is available for acceleration up to the normal maximum of 30 miles per hour. With the particular adjustment of transmission and the particular chain and sprocket combination employed in the application under consideration, the transmission completes its shift into the high gear position at about 30 miles per hour, and from that point on any increase in vehicle speed leaves the ratio unchanged. Increase in vehicle speed above 30 miles per hour therefore necessitates increase in engine speed, as indicated by the oblique upper portion of the curve 206, but in a small vehicle of the size and weight propelled by an engine such as that in the application under consideration, such speeds are normally not attainable on the level, and this possible increase of engine speed above the point at which the horsepower curve peaks is obtainable only when running down hill.

Curve 207 represents the variation of engine speed with vehicle speed under the no load condition corresponding to the curve 202. This curve shows the same general response of engine speed to change of vehicle speed, but it will be noted that for any vehicle speed, the corresponding speed of the engine under no load condition is appreciably lower. This permits a great increase in life of the engine and reduction of maintenance costs if the operator chooses to use only partial throttle opening during acceleration.

By appropriate change of the curvatures of the ball ramp in the countershaft unit 46, it is possible, if desired, to delay the point at which change of ratio from normal extreme low gear position commences until the peak of the power curve is reached at 2500 R. P. M., and then to introduce a rapid change of ratio to hold the engine speed at this peak value at higher road speeds. The engine speed versus vehicle speed curve for such a construction is indicated by the dashed curve 208 where it diverges from the curve 206.

If it be considered that the curve 206 represents the performance which would be obtained with the springs 182 and 183 of the countershaft unit 46 in the position of intermediate adjustment afforded by screwing the screws 185 and 186 inward a distance equal to half their threaded length, then retracting these screws to their extreme rightward position as seen in Fig. 4 would result in an engine speed versus vehicle speed curve as indicated by the line 209, the lower and upper portions of which merge into the curve 207. Conversely, maximal initial compression of the springs achieved by screwing the adjusting screws 185 and 186 inward the full threaded length, would result in an engine speed versus vehicle speed curve as suggested by the curve 210. It is evident that this adjustment, which is under the control of the operator, permits the operator of the machine to adjust the effective transmission ratio to suit his individual needs. A lightweight rider, for instance, might use the adjustment indicated by curve 209, while a heavyweight rider might prefer the adjustment indicated by the curve 210.

In vehicles in rental service or in messenger and delivery service where the operators might be inclined to ride the vehicles more or less continuously at maximal speeds and maximal throttle openings, excessive strain on the engine may be avoided by substituting for the ball ramps 162 and 187 of the countershaft unit 46, ramps having less curvature. If the ramps are modified in this manner, the curve of engine speed versus vehicle speed at full throttle opening may be modified in the manner of curve 211. It will be noted that a curve of this sort permits use of peak engine power for maximal performance both in acceleration and in hill climbing at low or moderate vehicle speeds, but when the vehicle speed reaches approximately 20 miles per hour, the ratio change of the transmission becomes progressively greater so that the engine actually slows down with increase of vehicle speed. This means that the engine is held at a speed below the one at which it delivers maximal power, and the normal high speed of the vehicle on a level road is somewhat reduced. This slight reduction in engine output and substantial reduction in engine speed is of great value in prolonging the life of the engine and minimizing maintenance expense, and the advantage of such an arrangement to a commercial operator is manifest.

Consideration of the engine torque curve 200 will show that engagement of the clutch begins at a point substantially below the speed at which the engine develops maximal torque. This means that during the first portion of the starting and accelerating period, the tractive effort is not as great as it would be if greater engine torque could be applied at any particular ratio. If it is important that maximal starting performance of the vehicle be attainable, the tension of the grommet spring 130 in the unit 45 may be increased or the weight of the spring may be reduced by removal of a portion of the filler spring 131, by substitution of a filler spring of lighter weight or by total elimination of the filler spring, and the clutch will accordingly not begin to engage until a relatively high engine speed has been attained. If the clutch be modified in this manner, the low speed portion of the engine speed versus vehicle speed curve 206 will be modified as suggested by the curve 212.

It is understood that the performance curves discussed above are peculiar to one particular type of engine with its individual horsepower and torque characteristics. In a group of engines of presumably identical characteristics, some variation in performance at different speeds will often or usually appear. It is obvious that the individual adjustment made possible by the construction of the transmission of my invention permits substantial modification of transmission characteristics to obtain the best possible performance or the most desirable performance from any particular engine. It should also be noted that the overall response of the transmission to tractive effort, engine torque, and vehicle speed is modified by the reduction ratio of the sprocket and chain employed and by the total load and force constants of the springs 122 and 123 in the unit 45. Change of sprocket ratio will have the general effect of increasing or reducing the miles per hour scale of the charts of Figs. 16 and 17. Change of the total load or force constants of the springs 122 and 123 is equivalent to change of the total load and force constants of the springs 182 and 183 in the unit 46.

In the use of my transmission, the V-belt, which is generally of rubber and fabric construction, gradually diminishes in transverse width due to compression and abrasion by the surfaces of the pulleys and to other factors causing wear, and special provision is made to permit adjustment of the transmission to compensate for belt wear.

When a new V-belt is used in the transmission, it will be found that when the belt is occupying the extreme low gear position in which it has the minimal pitch diameter on unit 45, the width of the new belt is such as to prevent the pulley face 161 of unit 46 from coming into the extreme rightward or closed position characteristic of the low gear condition with a used belt. In this position of the pulley face 161, the ball ramps 162 and 187 may not be pressed together sufficiently to retract the balls 191 into a circle of minimal diameter in which each ball touches the adjacent ones. Since, under these conditions, the balls 191 might be loose between the ramps 162 and 187 and have a tendency to rattle when the speed of rotation is so low that centrifugal force is insufficient to overcome the force of gravity on the balls, the marcel spring 190 interposed between the ramp 187 and the housing portion of the pulley face 153 is depended upon to force the ramp 187 toward the ramp 162 and in this manner take up any slack between the balls and the ramp. The balls 191 are thus properly centralized on the minimal pitch circle until such time as centrifugal force enables them to first compress the marcel spring 190 and then separate the pulley faces by direct pressure upon the ramps.

In the high gear position, the belt 47 has its minimal pitch diameter on the unit 46 and the separation of the pulley faces 161 and 153 is limited by abutment of the member 180 against the washer 149, the extreme rightward position of which is in turn determined by the adjustment of the screw 159. When a new belt is used, it is necessary to retract the screw 159 to permit the washer 149 to assume a position as far to the right in Fig. 4 as possible in order to allow the pulley faces to separate a distance sufficient to accommodate the new belt in the position of minimal pitch diameter. As the belt diminishes in width due to wear, it may seat more deeply in the pulley of unit 46 and eventually bear against the fingers 165, and for this reason the fingers 165 have edges so formed that the belt may run against them without damage. If the power transmitted by the belt is relatively light, it may be transferred from the inner face of the belt 47 to the fingers 165 without abnormal slip, even though at high speeds the centrifugal action of the balls 191 against the ramps 162 and 187 may separate the pulley faces 161 and 153 so far that no appreciable side contact is made against the belt 47. If the power being transmitted is high, however, the flat contact of the belt against the fingers may be insufficient to transmit this power without undue slip, and it may become necessary to restore the side contact of the pulley faces against the belt. This is done by turning the screw 159 inward so that it moves the key 157 leftward in Fig. 4 and establishes a new limiting position for rightward travel of the member 180. This adjustment may be easily made by the operator of the vehicle whenever the engine gives audible evidence of racing when the machine is travelling at high speed.

In Fig. 18 I show an alternative form of the unit 46 in which means are provided for making the transmission ratio responsive to the vacuum created in the engine intake. In this case the countershaft unit 46 is mounted on a countershaft 220 which, except for the end portion upon which the unit 46 is mounted, is similar to the countershaft 48 in the apparatus previously described, and is similarly connected with the other associated parts. In the form of the unit shown in Fig. 18 the hub 221 takes the place of the hub 155 in the previously described unit and is connected for rotation with the countershaft 220 by means of a key 222. The hub 221 is retained on the countershaft by snap ring 160 engaging a groove on the countershaft. The springs 182 and 183 act at one end on the member 180 and at the other end on a washer 223 which abuts the adjusting screws 185 and 186 and is turned inwardly to pilot on the hub 221.

Surrounding the spring 183 and clamped between the spring 183 and the abutting surfaces at either end thereof, is a cylindrical sheet 224 of flexible material, such as rubber, composition, or fabric, which forms with the supporting spring 183 an air-tight bellows providing a chamber within.

The countershaft 220 has an axial bore 225 extending part way from its outer end, and communicating with the bore 225 and the chamber within the bellows 224 is a passage 226. A fitting 227 has a cylindrical portion 228 fitting the bore 225 so as to permit the countershaft 220 to rotate while the fitting 227 remains stationary. A passage 230 connects with the bore 225 at one end and at the other end with suitable conduit means leading to the intake of the engine 41 in such manner that a vacuum is produced within the bellows 224 by operation of the engine 41. In order to permit compensation for wearing of the belt, the movable pulley face is made in two parts, the inner portion 231 being attached to the ramp 162 for piloting on the sleeve 156 in the same manner in which the movable pulley face 161 was connected thereto in the form of the unit previously described. The outer inclined portion 232 which is adapted to contact the belt 47 is attached to the inner portion 231 by three or more screws 233 which are threaded through the portion 231 and are riveted to the portion 232 as at 234 in such manner that the screws 233 may turn within the portion 232. It will be clear that with this construction the pulley face 232 may, for any position of the portion 231, be moved toward or away from the pulley face 153 as may be necessary to compensate for different widths of belt. The remaining parts of the unit 46 may be constructed as previously described in connection with the unit illustrated in Fig. 6.

The operation of the unit as illustrated in Fig. 18 is similar to the operation of the previously described unit of Fig. 4, except that in the unit of Fig. 18, the position of the movable pulley face 232 is changed as the degree of vacuum produced by the engine changes. The vacuum within the bellows 224 tends to counteract the compressive force of the springs 182 and 183, so that the greater the degree of vacuum, the more the pulley face 232 will be moved away from the opposing pulley face 153 and the more the transmission will be shifted toward the high gear condition. The degree of vacuum produced by the engine is dependent upon the throttle opening and the speed of the engine, increasing with the speed, and decreasing as the throttle is opened. The vacuum produced within the bellows 224 may be further modified by a valve in the conduit connecting passage 230 with the engine intake.

It will be evident that many different effects may be secured by adjustment of the screws 185 and 186 to vary the compression of the springs 182 and 183, and by varying the adjustment of the vacuum control valve. One desirable condition is that in which the belt 47 occupies an intermediate position on the pulley of unit 46 when the engine 41 is idling. Under these circumstances the compressive force of the springs 182 and 183 is partially balanced by the vacuum within the bellows 224, and when the engine throttle is opened to accelerate the vehicle, the degree of vacuum within the bellows 224 is lessened, permitting the springs 182 and 183 to act on the equalizer arms 173 to move the pulley face 232 closer to the opposing pulley face 153 and quickly bring the transmission into low gear position. As the speed of the vehicle builds up and less throttle opening is required, the degree of vacuum within the bellows 224 will increase and assist the centrifugal action of the unit in bringing the movable pulley face 232 to the extreme high gear position.

In Fig. 19 is shown an alternative form of the clutch portion of the unit 45 in which the inclined tooth mechanism for starting is eliminated and the clutch is engaged for starting by the inward movement of the grommet spring, which results when the unit comes to rest. In this form of the unit 45, a ramp 240 is attached to the housing 103 at 126, as in the form of the apparatus previously described, and has substantially the same shape in its outward portion as the ramp 125 in the form of the unit shown in Fig. 4. The inner portion of the ramp 240, however, preferably extends inwardly substantially parallel to the plane of rotation nearly to the member 137. A floating plate 241, similar in its outer portion to the floating plate 127 of the previously described unit, is connected for rotation with the ramp 240 by the ears 128 projecting through holes in the ramp 240. The inner portion of the floating plate 241 is formed into a frusto-conical shape directed toward the opposing ramp 240. The grommet spring 130 is similar to the spring described in connection with the unit of Fig. 4 except that it is made with a fewer number of turns in the outer spring to permit it to retract into a circle of smaller diameter.

With the construction shown in Fig. 19, it is evident that when the mechanism comes to rest, as is the case when the engine stops, the grommet spring 130 will retract inwardly and by engagement with the ramp 240 on one side and the floating plate 241 on the other side, will force the floating plate 241 leftward, resulting in engagement of the floating plate 241 with the friction surface 133, and engagement of the friction surface 134 with the housing 103. In this condition the engine 41 is connected through the clutch to the pulley of the unit 45 and if the vehicle is moved forward, the engine will be rotated and will start. When the engine starts, the resultant increase in speed will cause the grommet spring 130 to expand under the influence of centrifugal force until it occupies the position shown in Fig. 19. In this position the clutch is disengaged and the engine may idle freely. Further increase in engine speed will result in normal engagement for driving the vehicle in the manner set forth previously in connection with the apparatus of Fig. 4. Normal engagement and disengagement of the clutch under variations of vehicle speed, load, and throttle opening, will automatically occur in the manner previously described. When the engine stops, either through intentional closing of the throttle or turning off of the ignition by the operator, or accidentally through operation of extraneous factors, the reduction in rotational speed of the clutch assembly permits the grommet spring 130 to retract to such a point that re-engagement of the clutch for starting is established.

While not essential for the functioning of the mechanism, it is desirable to provide a spring 242 for the purpose of centralizing the grommet spring 130 when in the idling position so that it cannot rotate eccentrically or out of balance, and thus prevent possible partial or intermittent and erratic clutch engagement. This spring 242 may take the form of a marcel spring bearing on the ramp 240 and threaded through various of the ears 128. This spring then urges the floating plate 241 rightward in such manner as to always maintain contact between the grommet spring 130 and the ramp 240 at one side, and the floating plate 241 at the other side.

In the alternative form of the unit 45 shown in Fig. 20, a flat floating plate 245 parallel to the plane of rotation is employed on one side of the grommet spring 130 and a ramp 246 is positioned on the other side of the grommet spring and is so shaped as to approach the plate 245 on either side of an intermediate diameter. A coil spring 247 bearing at one end on the housing 103 and at the other end on the floating plate 245 assures contact of the grommet spring 130 with both the floating plate 245 and the ramp 246 at all times. In this form of the unit a single member 248 takes the place of the disc 132 and the member 137, being connected at its outer end with the friction faces 133 and 134, and at its inner end to the pulley face 110 by means of the lugs 139. This construction eliminates the coupling teeth 135 and 136 of the previously described construction, but is accompanied by the disadvantage that as the member 248 moves during engagement and disengagement of the clutch, the pulley face 110 is also required to move. To permit the limited movement required of this pulley face, the hub 102 is reduced at 250 to permit movement of the bushing 107 upon it.

The operation of the unit illustrated in Fig. 20 is similar to that of the previously described unit shown in Fig. 19. The parts are shown in the position which they would take during idling of the engine. When the engine stops, the grommet spring 130 retracts inwardly and the curved inner portion of the ramp 246 introduces an increased component of axial engaging force which is exerted against the floating plate 245, and in this manner the clutch is engaged preparatory to restarting the engine by motion of the vehicle in a forward direction. As the engine speeds up from the idling condition, the grommet spring 130 is thrown outward and the clutch is engaged for moving the vehicle forward as previously described.

In Fig. 21 is illustrated an alternative form of the clutch portion of the unit 45 in which two grommet springs are employed to perform separately the functions of clutch engagement for engine starting and clutch engagement for movement of the vehicle. A ramp 251 is provided of the same general character as the ramp 125 in the unit illustrated in Fig. 4 and is attached to the housing 103 in a similar manner. The ramp 251 has an arcuate inner portion within which is nested the grommet spring 252. Preferably welded to the inner edge of the ramp 251 is another ramp 253 which approaches the floating plate 245 as it proceeds inwardly and has an arcuate outer portion within which is adapted to be nested a grommet spring 254. Except for the fact that no retracting spring for the floating plate 245 is required, the construction of the remainder of the unit is similar to that previously described in connection with Fig. 20. The parts of the mechanism are shown in the positions which they take when the engine is idling. The grommet spring 252 cooperates with the ramp 251 and the floating plate 245 to effect clutch engagement at speeds of the engine greater than idling speed in the same manner as has previously been described in connection with the apparatus of Fig. 4. When the engine stops, the grommet spring 254 retracts inwardly to a smaller diameter and by reason of engagement with the ramp 253 forces the floating plate 245 to the left, causing the clutch to engage, whereupon the engine may again be started by forward motion of the vehicle. When the engine starts, the grommet spring 254 will be thrown outward into the position shown in Fig. 21, resulting in disengagement of the clutch to permit free idling of the engine. Employment of two springs 252 and 253, instead of one, makes it easier to proportion the parts of the mechanism with minimal mechanical compromise.

While I have disclosed my transmission in connection with a three-wheeled vehicle, it will be understood that the transmission may be employed in the propulsion of a two-wheeled vehicle, which, for example, may be of the general type disclosed in the patent application of Howard B. Lewis, Bruce Burns, Austin E. Elmore, and Esley F. Salsbury, Serial No. 202,868, or in any other suitable form of vehicle. It will also be understood that various variations or modifications in design or construction of the parts of the apparatus of my invention other than those disclosed herein may be made by those skilled in the art without departing from the spirit and scope of the appended claims.

The invention disclosed herein was disclosed in my application Serial 253,557, filed January 30, 1939, entitled "Motor vehicle and automatic power transmission means therefor," of which this is a division.

For the purpose of particularly pointing out the inventions sought to be protected by this application, the following is submitted. This application is directed especially to the accomplishment of the objects of the invention previously recited. It will be understood that there has been previously disclosed a motor vehicle which is driven by the engine 21. This engine is an internal combustion engine which must be started by means external to the engine, since the engine cannot be depended upon to start itself. To start the engine it is necessary that it be rotated by power applied to the engine. It is also necessary that the engine be rotated at a speed sufficient to allow the engine to develop sufficient power to thereafter run by its own power. It is also necessary that the engine be started with little or no load and, as a practical matter, that the engine shall not propel the vehicle, as the operator is then not in the vehicle but pushing it forward while standing on the surface upon which the vehicle rests.

In the form of vehicle shown a centrifugally operated main clutch operated by the grommet spring 130 is provided. The engine drives the vehicle through this clutch which is always disengaged when the engine is driven at idling speed.

While this main clutch is automatic, it is not necessary that an automatic clutch be provided but it is highly desirable that means be provided for allowing the engine to run at idling speed after it is started without necessarily driving the vehicle.

It will be understood that the engine is started through what may be termed an over-running clutch consisting of parts 103 and 138 to 142, inclusive. Broadly considered, this ratchet clutch operates to connect the countershaft 48 with the engine 101 while the main clutch, which is operated by the grommet spring 130, is disengaged. It should not be confused with over-running clutches which are used to provide "free wheeling," since it operates in a different manner. The function of the over-running clutch is to provide means by which the movement of the vehicle can drive the engine but through which the engine cannot drive the vehicle. It will be understood that the ratchet clutch permits the engine to be started by pushing the car forward but immediately releases when the engine starts, so that the engine thereafter runs free without driving the car until such a time as the main clutch is engaged.

It will also be understood that the ratchet clutch can never be engaged by moving the vehicle backward and that the operator can at any time pull the vehicle backward if the main clutch is disengaged without starting the engine if it is at rest, and without causing the engine to drive the car if the engine is running. This is due to the fact that the ratchet clutch engages only when the vehicle is moved forward.

It will also be understood that the ratchet clutch prevents the engine from stopping or stalling as long as the vehicle is moving forward, as the ratchet clutch engages whenever the engine slows down to a point at which the engine driven elements of the ratchet clutch tend to rotate slower than those elements which rotate due to the forward movement of the vehicle.

The success of this method of using a ratchet clutch is largely dependent on the characteristics of the automatic V-belt transmission reduction gear consisting of the elements 153 to 191, inclusive. The purpose of this gear is to change the speed ratio which may be defined as a fraction, of which the engine speed in revolutions per minute is the numerator and the speed of the vehicle in miles per hour is the denominator. The value of this fraction is greatest when the engine is running at full speed and the vehicle is at rest. Using conventional phrases, the vehicle is then in "low gear." As the speed of the vehicle is increased the centrifugal force exerted by the balls 191 tends to reduce the value of this fraction and the reduction gear gradually assumes a position in which the vehicle may be said to be in "high gear." Experience shows that while the engine may be started by the operator pushing the vehicle forward while the reduction gear is in low gear, it is difficult, if not impossible, for an operator to run fast enough to start the car when it is in high gear. The reduction gear above described automatically assumes the low gear position whenever the vehicle is stopped and it is then in the low gear or best position to allow the operator to start the engine by moving the vehicle forward.

The preceding application broadly discloses a novel means for driving a vehicle which is diagrammatically shown in Fig. 22, in which an internal combustion engine or other power-producing means 301 drives a driving shaft 302. The driving shaft 302 can either drive a countershaft 303 through a centrifugal clutch 304 or the countershaft 303 can drive the driving shaft 302 through a one-way over-running clutch 305. The countershaft 303 can either drive an axle 306 through a power transmission mechanism 307 or the countershaft 303 may be driven from the axle 306 through the transmission 307.

The instrumentalities used in the above combination must have definite characteristics. The clutch 305 must be capable of transmitting power from the shaft 303 to the shaft 302 and at the same time incapable of transmitting power from the shaft 302 to the shaft 303. The clutch 304 operates in parallel with the clutch 305 and is depended upon solely as a driving clutch; that is, a clutch which transmits power from the shaft 302 to the shaft 303. The clutch 305 acts as a starting and maintaining clutch. With the vehicle at rest the engine can be started by pushing the vehicle forward. When this is done the wheel 308 drives the shaft 303 through the transmission 307, and the shaft 302 is driven through the clutch 305 from the shaft 303. To enable the engine to continue running after such starting without continuing to move the vehicle, it is necessary that the clutch 304 be disengaged so that the shaft 302 cannot drive the shaft 303 through the clutch 304 until the operator is seated in the vehicle and desires to travel.

The clutch 305 operates as a maintaining clutch when the vehicle is running. It is of such a character that the shaft 303 can never run faster than the shaft 302, and, conversely, the shaft 302 must always rotate at least as fast as the shaft 303. If the vehicle is moving, the shaft 303 is turning and the shaft 302 must also turn so that the engine cannot "stall" or stop. The transmission 307 plays an active part in preventing such stalling since, as the vehicle slows down, the factor represented by the speed of the shaft 303 divided by the speed of the axle 306 increases in value. As a result the proportionate speed of the shaft 303 compared to the speed of the axle 306 increases as the vehicle slows down, and even at low vehicle speeds the engine is forced to rotate at a speed above that at which the engine will stall.

The clutch 304 is preferably a clutch which is thrown into engagement by centrifugal means whenever the engine is rotated above what may be called top idling speed. Since the clutch 304 is disengaged below this speed, the engine can be started through the clutch 305 and run freely below this top idling speed without the clutch 304 engaging.

The transmission 307 is a variable speed transmission the ratio of which is controlled wholly by the speed of the wheel 308 or, in other words, by the vehicle speed. The axle 306 always rotates at vehicle speed. When the vehicle is running slowly, the transmission factor represented by the division of the speed of the shaft 303 by the speed of the shaft 306 is high. As the vehicle speed increases this factor is automatically reduced in value. By using such a transmission in such a manner several valuable results are attained. When the vehicle is at rest the transmission factor is always high. As a result the engine may run at relatively high speed and still deliver power to the wheel which turns with high torque at low speed. Also, if the engine is not rotating, a slight forward push tends to rotate the engine at high speed to facilitate starting. As the speed of the vehicle increases, the value of the transmission factor decreases so that relatively high vehicle speeds may be attained without overspeeding the engine.

By making the clutches 304 and 305 and the transmission 307 entirely automatic in their action, the driver of the vehicle can entirely control the operation of the vehicle by controlling the fuel supply of the engine through the conventional throttle. This combination of parts makes it possible to produce a very safe and easily controlled vehicle having a very superior type of performance, and the absence of the usual control levers and parts makes it possible to produce very satisfactory power driven vehicles of low first cost and high efficiency.

The parts described above are, of course, the parts previously described. The engine 301 is the engine 101 shown in Fig. 4, and the shaft 302 is the engine crankshaft 44. The shaft 303 is equivalent to the tubular pulley hub 107. The ratchet clutch 305 is the clutch consisting of the members 137 to 144, etc. The centrifugal clutch 304 is the clutch consisting of the parts 125 to 136, etc. The automatic transmission 307 is made of the parts 153 to 184, etc., including the belt 47. The countershaft 48 is equivalent to the axle 306, the fact that in the vehicle previously described a chain drive is inserted between the wheel and the shaft 48 being a mere matter of convenience.

While it is recognized that each of the above described elements 304, 305, and 307 is patentable as a separate instrumentality, it is obvious that when combined in a vehicle drive the combination produces certain new and useful results as above described.

It is to be understood that Fig. 22 is purely diagrammatic, and that the specific mechanism shown in that figure is not and cannot be claimed herein, being inserted merely for the purpose of making it easier to understand how the mechanism previously described operates.

I claim as my invention:

1. In a vehicle driven by an internal combustion engine and having a reduction gear which drives a wheel of the vehicle through suitable mechanism, and a main clutch through which the engine may drive said vehicle through said reduction gear, means for starting the engine by moving the vehicle and preventing the engine from stopping while the vehicle is in motion, comprising the combination of: means for automatically causing said speed reduction gear to assume its position of maximum reduction whenever said vehicle is moving below a predetermined speed or is at rest; and an over-running or one-way clutch operative when said main clutch is disengaged and through which said wheel may drive said engine through said gear but said engine cannot drive said wheel.

2. In a vehicle having a wheel, an internal combustion engine carried by said vehicle, and a mechanism connected at its delivery end to said wheel, and through which said wheel is driven, and a main clutch connected to the receiving end of said mechanism and adapted to connect said engine to and disconnect said engine from said receiving end of said mechanism, a means for starting said engine by causing it to rotate due to a forward movement of said vehicle and allowing said engine to freely rotate thereafter without exerting a driving force on said vehicle, comprising: a driving element mechanically connected to and rotating in synchronism with said engine; a driven element connected to and rotating in synchronism with the receiving end of said mechanism; and a clutch means between said driving element and said driven element whereby the driving element may transmit power to and drive said driven element but through which said driven element cannot transmit power to or drive said driving element.

3. A drive for a vehicle which carries an internal combustion engine and which has a driving wheel for propelling the vehicle, the combination of: a mechanism connected at its delivery end to said wheel and through which power is delivered to cause said wheel to turn; a main clutch connected to the other or power-receiving end of said vehicle and adapted to be connected or disconnected from said engine so that said engine can drive said wheel or said wheel can rotate freely without connection to said engine; a driving starting clutch element rotating at all times in synchronism with said engine and through which said engine may be rotated to start same; a driven starting clutch element rotating at all times in synchronism with said wheel and driven by said wheel; and clutch means between said driving starting clutch element and said driven starting clutch element whereby said driving element can transmit power to said driven element but said driven element cannot transmit power to said driving element.

4. In a vehicle carrying an internal combustion engine and having a driving wheel by means of which the vehicle may be propelled, said vehicle having a driving mechanism through which said engine may drive said wheel and a main clutch which, when engaged mechanically, connects said engine to said wheel through said mechanism and which, when disconnected, permits said wheel to turn freely without receiving or transmitting power from or to the engine, means by which said engine may be started when said main clutch is disconnected and which is so constructed that said engine after starting can rotate freely without delivery of power through said mechanism to said wheel, comprising: a driving starting clutch element rotating at all times in synchronism with, and receiving power generated by the rotation of, said wheel; a driven starting clutch element rotating at all times in synchronism with said engine and delivering power which may be used to start said engine; and clutch means by which said driving element may drive said driven element, said clutch means being so constructed that said driven element cannot drive said driving element.

5. In a vehicle carrying an internal combustion engine and having a driving wheel through which said vehicle may be propelled, the combination of: speed reduction mechanism through which said engine may drive said wheel, said speed reduction mechanism being so constructed that with the engine rotating at a constant speed said speed reduction mechanism may act in low gear position to rotate said wheel at a relatively low speed or with the engine rotating at said speed said speed reduction mechanism may act in high gear position to rotate said wheel at a relatively high speed; means by which, when said wheel is rotating at said relatively slow speed or is at rest, said speed reduction mechanism is automatically caused to assume said low gear position; a main clutch for connecting and disconnecting said engine from said speed reduction gear; a starting clutch driving element connected to and driving said engine; a starting clutch driven element driven by said wheel through said speed reduction gear; and clutch means by which said driven element drives said driving element, said clutch means being so constructed that said driving element can rotate freely at a speed higher than that of said driving element without transmitting power from either of said elements to the other.

BRUCE BURNS.